(12) United States Patent (10) Patent No.: US 7,721,993 B2
Law et al. (45) Date of Patent: May 25, 2010

(54) WIRE-STRIKE DEFENCE SYSTEM

(75) Inventors: James Donald Law, Stratford (NZ); Robert Mark Law, Whakatane (NZ); Dean Charles Smith, Wanaka (NZ)

(73) Assignee: Arcit Limited, Stratford (NZ)

( * ) Notice: Subject to any disclaimer, the term of this patent is extended or adjusted under 35 U.S.C. 154(b) by 0 days.

(21) Appl. No.: 10/576,903

(22) PCT Filed: Oct. 12, 2005

(86) PCT No.: PCT/NZ2005/000265

§ 371 (c)(1),
(2), (4) Date: Aug. 8, 2007

(87) PCT Pub. No.: WO2006/068507

PCT Pub. Date: Jun. 29, 2006

(65) Prior Publication Data

US 2008/0001034 A1    Jan. 3, 2008

(51) Int. Cl.
*B64D 7/00* (2006.01)
(52) U.S. Cl. .............................. 244/121; 244/1 A
(58) Field of Classification Search ............... 244/34 R, 244/121, 129.1; 231/7; 52/101; 49/59; 83/928, 83/701
See application file for complete search history.

(56) References Cited

U.S. PATENT DOCUMENTS

| 2,106,323 A * | 1/1938 | Huntington ............. 244/134 R |
| 4,407,467 A | 10/1983 | Emigh et al. |
| 4,826,103 A | 5/1989 | McKown |
| 5,286,170 A | 2/1994 | Brannon |
| 5,415,364 A | 5/1995 | Grant |
| 6,933,446 B1 * | 8/2005 | Waldorf et al. ........... 174/117 F |

FOREIGN PATENT DOCUMENTS

| GB | 2 075 940 A | 11/1981 |
| WO | WO 99/38770 | 8/1999 |

* cited by examiner

*Primary Examiner*—Timothy D Collins
*Assistant Examiner*—Michael Kreiner

(57) ABSTRACT

A wire-strike system (1) including; a wire cutter with at least one pair of electrodes (5, 6), electrically insulated from each other and mounted to an outer surface of an aircraft (2). The electrodes (5, 6) being connectable to a power source (11) capable of generating an electrical potential difference between the electrodes (5, 6) and in the event of a wire-strike, supplying a short-circuit current flow through a portion of the wire connecting both electrodes (5, 6).

26 Claims, 14 Drawing Sheets

Figure 7
7a
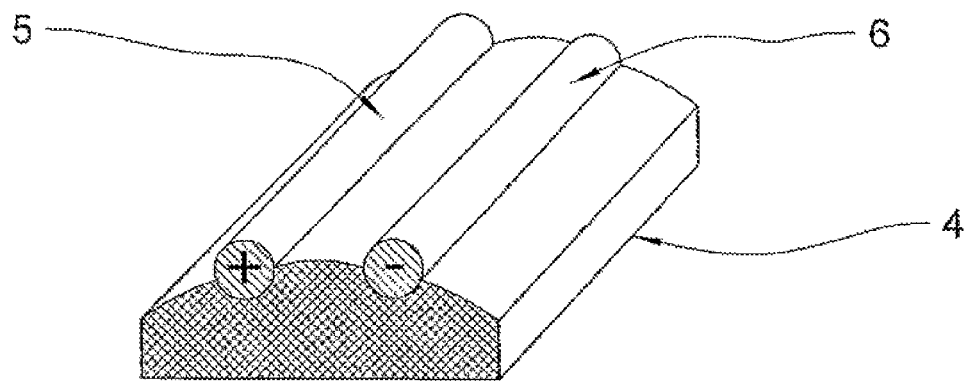
7b
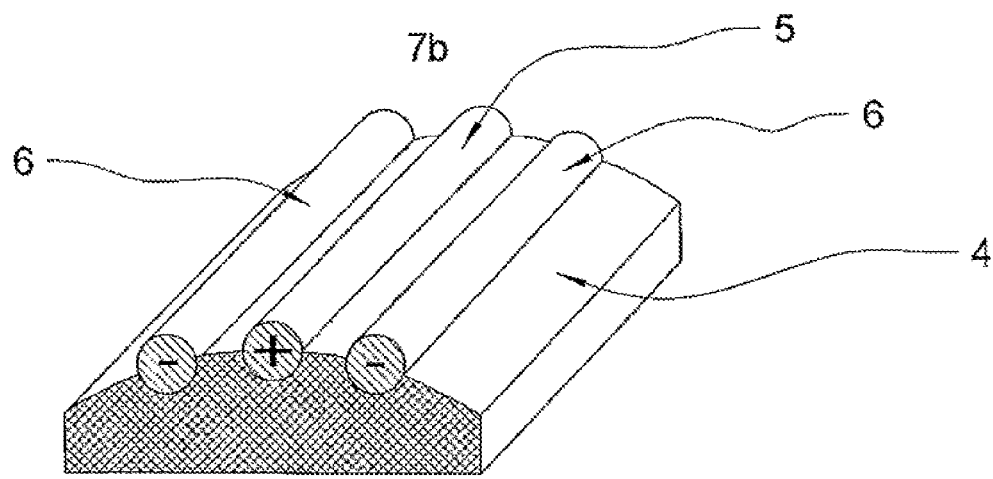
7c
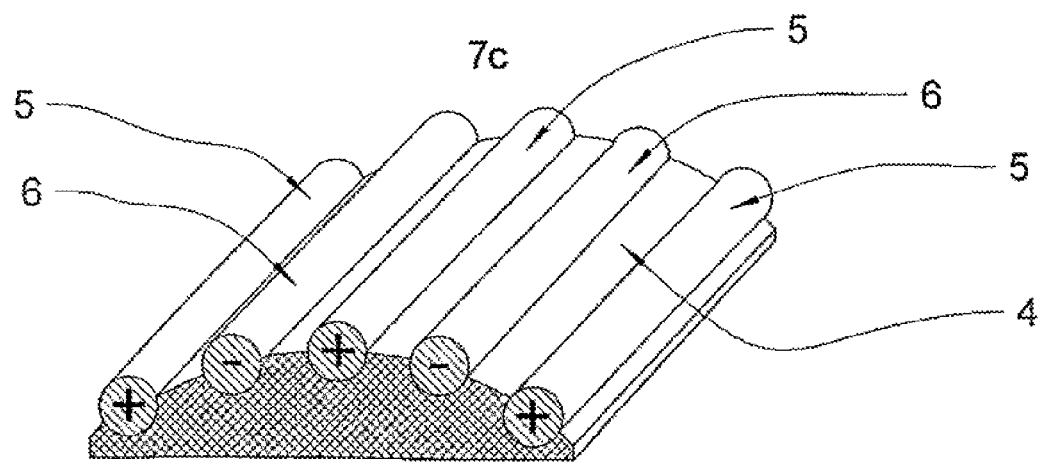

WIRE-STRIKE DEFENCE SYSTEM

CROSS-REFERENCE TO OTHER APPLICATIONS

This is a National Phase of International Application No. PCT/NZ2005/000265, filed on Oct. 12, 2005, which claims priority from New Zealand Patent Application No. 537472, filed on Dec. 23, 2004.

TECHNICAL FIELD

The present invention relates to a system to protect movable craft particularly aircraft and other low altitude craft in the event of a wire-strike impact. The invention may also be used as a tool for method of entry (MOE) applications including military and law enforcement operations, pathway clearing and anti terrorism functions.

BACKGROUND ART

Wire strikes are a potentially fatal risk facing all rotor and fixed wing aircraft, particularly those engaged in low flying activities such as nap of the earth (NOE) military flying, crop spraying, hunting, sightseeing surveillance and the like. While maintaining vigilant observation and researching potential flight path hazards reduce the likelihood of wire strike, wires and lines remains extremely difficult to detect from a cockpit. Even if detected, accurately discerning the distance from the craft to a power line can be very difficult. This is further compounded in the case of thinner less visible lines such as communication lines. Research has shown that in over 40% of wire-strike accidents, the pilot was aware of the existence of the wire. Moreover, contrary to popular misconceptions, the majority of wire strikes are incurred by experienced pilots in clear weather.

It is thus not possible to rely on pilot awareness to avoid wire strikes and so a form of on-board defence system may provide a potentially life saving feature. Several systems have been trialled including the mechanical wire cutters described in the following patents:

GB 2,075,940: WO 99/38770: U.S. Pat. No. 4,826,103; 5,286,170 and 5,415,364 each describe means of mechanically severing a wire impacting the aircraft. The mechanism employed typically involves some form of guide elements configured to urge the wire into a set of jaws for severing, either by fixed sharpened surfaces or a guillotine powered by explosive actuators. These systems posses several shortcomings including;

- a potential hazard to ground crew from the guide elements used to trap the wire in the cutting jaws which typically project forwards from the aircraft fuselage/wings;
- increased windage, cost and unwieldiness,
- increasing the visible and electromagnetic signature of the craft detrimental to stealthy military operations.
- the 'capture' area of the severing jaws is relatively narrow leaving other areas of the craft vulnerable to impact damage;
- reliance on moving actuators to sever the wire;
- only provides protection against frontal impacts in forward flight; and
- may be dependant on the forward speed of the craft and the sharpness of the cutting surfaces.

A key disadvantage of fixed guillotine-type wire cutters is their dependence on the speed of impact to provide the necessary energy to force the wire between the cutting jaws to be severed. Consequently, a slow flying aircraft/helicopter may not provide sufficient impetus to instantaneously sever the wire, whilst the deceleration due to the impact may reduce the craft's airspeed to the point of stalling and thus still precipitating a crash.

This effect is compounded by the degree of slack common in most suspended wires and lines. An aircraft may be sufficiently decelerated by taking up the slack in the wire to stall the aircraft and/or fail to force the wire through the cutting jaws with insufficient energy for severing.

It is thus desirable for a wire-strike defence system to operate without complete dependence on the airspeed of the aircraft.

U.S. Pat. No. 4,826,103 discloses a means of addressing the aforesaid disadvantages in static mechanical wire cutters by way of an automatic-firing, powered guillotine. Whilst this provides a more instantaneous response to wire-strike, the system is complex and depends on several moving parts and interacting components with an attendant reliability and cost liability.

U.S. Pat. No. 4,407,467 implements a different cutting technique to the above, whereby a forwardly extending inclined boom or 'probe' is fitted with a plurality of explosively-powered cutting means. An impacted wire slides along the probe until encountering a cutting means which triggers an explosion. It the cable remains un-severed, the wire continue along the probe to the next cutting means triggering a second explosion and so on. Nevertheless, the system disclosed still suffers from several of the above-described drawbacks and in particular presents an unwieldy structure for attachment to an aircraft together with the clear hazards associated with the presence of multiple explosive devices located adjacent the aircraft.

Consequently, there is a need for a robust compact wire-strike defence system that may be placed unobtrusively on any chosen portion of the aircraft which preferably operates independently of the craft's airspeed.

All references, including any patents or patent applications cited in this specification are hereby incorporated by reference. No admission is made that any reference constitutes prior art. The discussion of the references states what their authors assert, and the applicants reserve the right to challenge the accuracy and pertinency of the cited documents. It will be clearly understood that, although a number of prior art publications are referred to herein, this reference does not constitute an admission that any of these documents form part of the common general knowledge in the art, in New Zealand or in any other country.

It is acknowledged that the term 'comprise' may, under varying jurisdictions, be attributed with either an exclusive or an inclusive meaning. For the purpose of this specification, and unless otherwise noted, the term 'comprise' shall have an inclusive meaning—i.e. that it will be taken to mean an inclusion of not only the listed components it directly references, but also other non-specified components or elements. This rationale will also be used when the term 'comprised' or 'comprising' is used in relation to one or more steps in a method or process.

It is an object of the present invention to address the foregoing problems or at least to provide the public with a useful choice.

Further aspects and advantages of the present invention will become apparent from the ensuing description which is given by way of example only.

DISCLOSURE OF INVENTION

According to one aspect of the present invention there is provided a wire-strike system including;

a wire cutter including at least one pair of electrodes, electrically insulated from each other and mountable upon an outer surface of an aircraft, said electrodes being connectable to a power source capable of generating an electrical potential difference between tie electrodes and in the event of a wire-strike, supplying a short-circuit current flow through a portion of said wire connecting both electrodes.

As used herein, the term aircraft is not to be interpreted narrowly or exclusively and encompasses any type of movable terrestrial or airborne craft including manned and un-manned craft, fixed wing, swing/pivot wing aircraft, hovercraft and rotor craft such as helicopters, gyrocopters, drones and the like.

According to a further aspect, the present invention includes an aircraft including a wire-strike system as hereinbefore described.

According to one aspect, said electrodes are attached to an electrically insulated mounting base portion. In one embodiment, said base portion and electrodes are formed as an elongated strip, wherein the electrodes are elongated and located adjacent, but spaced apart from each other. Preferably, the electrodes are orientated substantially parallel to each other. It will be appreciated however, that alternative configurations are possible.

In an alternative embodiment, where the aircraft surface is formed from an electrical insulator, the conductive base portion may be omitted and the electrodes may be fixed directly to the aircraft's surface.

According to one embodiment, the system is positioned on one or more leading surfaces of an aircraft, including nose sections, windscreen, undercarriage, skids, wings, tail and the like.

In the event of a typical wire-strike impact by the aircraft with a conductive wire, the impact will strike a leading or prominent edge of the craft where the wire-strike system is preferably positioned. As the wire comes into contact with a pair of electrodes, a conductive path is formed therebetween to create a short circuit. This leads to a high current flow through the wire portion bridging the electrodes and the resultant elevated temperature causes the wire to melt and sever. If the impacted wire does not sever immediately, but instead slides along a portion of the aircraft fuselage/wing, the severing action of the current flow may be maintained by further electrodes placed along the prominent, or leading edges of said aircraft portions. The rapidity of the severing action is dependant on the amount of current flow through the bridging wire portion, which is in turn dependant on the voltage across the electrodes, and the resistance of the wire-bridging portion.

In a further embodiment of the present invention, at least one pair of said wire cutter electrodes nay be specifically formed as a corner entrapment element, capable of guiding a wire, for severing, into an intersection between convergent deflector portions located either side thereof. Preferably, said intersection is notched.

In an alternative embodiment, only the junction or the junction and deflector portions of said entrapment element are electrically conductive. In one embodiment, electrodes of opposing polarity may be positioned on opposing sides of said intersection. A contacting wire would thus form a conductive link between the electrodes when is deflected into the intersection.

The use of such entrapment elements provides several advantages. It permits the installation use of an effective Wire-strike defence system without needing to place conductive electrodes over all the leading edges and surfaces of the aircraft.

The entrapment elements may be positioned at corners and junctures of the aircraft fuselage where an impacting wire would naturally be deflected and entrapped, such as wing roots, tail plane junctions with the fuselage, mounting junctions of helicopter skids, antenna, the stem between the rotor and the upper helicopter cockpit/engine housing and so forth. Therefore, installation considerations are simplified significantly with commensurate cost reductions for materials and labour. Moreover, the use of such entrapment elements is particularly suited for retro-fitting to existing craft.

It will be appreciated that the entrapment elements may also be used in conjunction with elongated electrode pairs positioned along the leading edges, flight controls and cockpit/fuselage section for comprehensive protection.

In a further aspect, the electrodes located on said deflector portions and/or said intersection are formed with an outward cutting edge.

The present invention may be configured such that in use, all portions of the electrodes are simultaneously energised.

In the context of the present invention, energising a pair of electrodes refers to applying a potential difference between the conductors.

In an alternative embodiment, the present invention is provided with sensing and electrical control means for sensing the proximity of a wire and energising an electrode pair closest the wire. Sensing the proximity of a wire before impact may be accomplished by a variety of known sensing means including capacitive or inductive sensors. Similarly, said control means may be provided by numerous known means, including a dedicated processing and control unit specific to the wire-strike system, or form part of the aircraft's avionics controls.

The control means for selectively energising individual electrode pairs may incorporate manual override in addition to input from the proximity sensing means. Thus, for example a helicopter pilot may chose to disable rearward facing electrodes unless forward airspeed falls below a predetermined level. The nose, wing, or fuselage section for example may be controlled and activated independently of each other. Such selective sensing (whether automated or manual) enables a smaller power source to be used than would otherwise be require to continuously and concurrently energise all portions of the wire-strike system.

Subdividing the electrode pairs into shorter, independently energisable sections provides a means of reducing the current-limiting effects of long conductors. It also enables the remaining independent electrode sections to function even after damage to one or more other electrode sections.

According to a further aspect of the present invention, said power source includes, but is not restricted to, an integrated on-board aircraft power supply, an electrical generator, one or more capacitor(s), batteries, or any other suitable electrical storage and/or supply means capable of delivering an instantaneous high current supply.

It will be appreciated that the potentially catastrophic consequences of a wire-strike justify the option of single-use power sources which are disposed of after use. As an example, several forms of batteries may generate high short circuit current levels, but repeated discharges in such a manner can harm the battery and its maximum discharge capacity.

Although the system is preferentially formed as elongated strips, it is possible to configure the electrodes to cover wider areas such as the aircraft nose cone. In further embodiments, the wire cutter electrodes may be formed as a series of substantially equidistant conductors of alternately opposing electrical polarity, preferably mounted on a strip substantially outwardly convex in cross-section. Thus, the multiple adjacent conducting elements present an increased contact area to the wire, whilst the curved cross-section of the mounting strip reduces the risk of the impacting wire bridging multiple electrode pairs.

The conducting elements may be formed from a range of materials including copper, steel, carbon, or the like, including composites such as sintered carbon and copper braid. Preferably, the electrically insulated mounting base portion is formed from any suitably robust insulator such as plastics, and the like.

Due to the minimal degree of protrusion of the conductive strips and mounting portion from the aircraft surface, the present invention provides a far less cumbersome fitment than the prior art with negligible risk of physical injury to ground crew from sharp surfaces. To avoid the risk of injury from electrocution, the present invention may be simply isolated (e.g. by a switch) from the power supply while on the ground.

Furthermore, the electrodes may be provided with a thin coating or film to prevent inadvertent arcing due to human contact (watches, key, tools, mobile phones and the like) and moisture (e.g. rain, dew, clouds and so forth), encountered on the ground and whilst airborne. The protective coating is preferably non-conductive and configured to be readily removed ruptured or split by an airborne impact with a wire to expose the conductive element below the protective film and bring the wire into conductive contact with same.

The ease of application of the conductive strips enables application on numerous surfaces of the aircraft fuselage and/or wings/rotors without causing significant aerodynamic difficulties. Moreover, the strips may, for example, be applied to surfaces of a helicopter which may be impacted by a wire during rearward or lateral flight and in emergency helicopter autorotation forced landings. Such capability is absent from prior art wire defence systems.

The present invention is also eminently suited to maintaining a stealthy optical and electromagnetic signature for military helicopters, drones and other unmanned aircraft involved in NOE flying. The wire-strike system may be utilised on such aircraft to deliberately sever enemy communication and power lines and provide clear passage for other low-lying friendly aircraft. The invention may also be used for method of entry (MOE) applications for law enforcement and anti terrorism units and be mounted on any type of moving vehicle utilised for such operations.

The on-board electrical power source supply may be interfaced with the aircraft's instrumentation to give advanced indications of parameters such as electrical power reserve/status circuit continuity and so forth. As the electrodes only form a complete circuit when impacting a wire, conventional circuit continuity testing is not applicable and would not identify a further discontinuity in the circuit. This could be identified by monitoring the circuit impedance, or capacitance for any change, and providing the pilot with a corresponding cockpit warning signal.

The present invention thus provides a readily manufactured, easily fitted wire-strike defence system capable of implementation with a wide variety of aircraft, helicopters and the like which does not interfere with the performance of the craft. The present invention does not rely on the speed of the aircraft to supply kinetic energy to sever the wire and consequently, impacts with stack wire still result in an instantaneous severing of the wire without decelerating the aircraft.

BRIEF DESCRIPTION OF DRAWINGS

Further aspects of the present invention will become apparent from the following description which is given by way of example only and with reference to the accompanying drawings in which:

FIG. 7. shows a perspective views of the wire cutter electrodes in the form of an elongated strip;

BEST MODES FOR CARRYING OUT THE INVENTION

Figure 1:
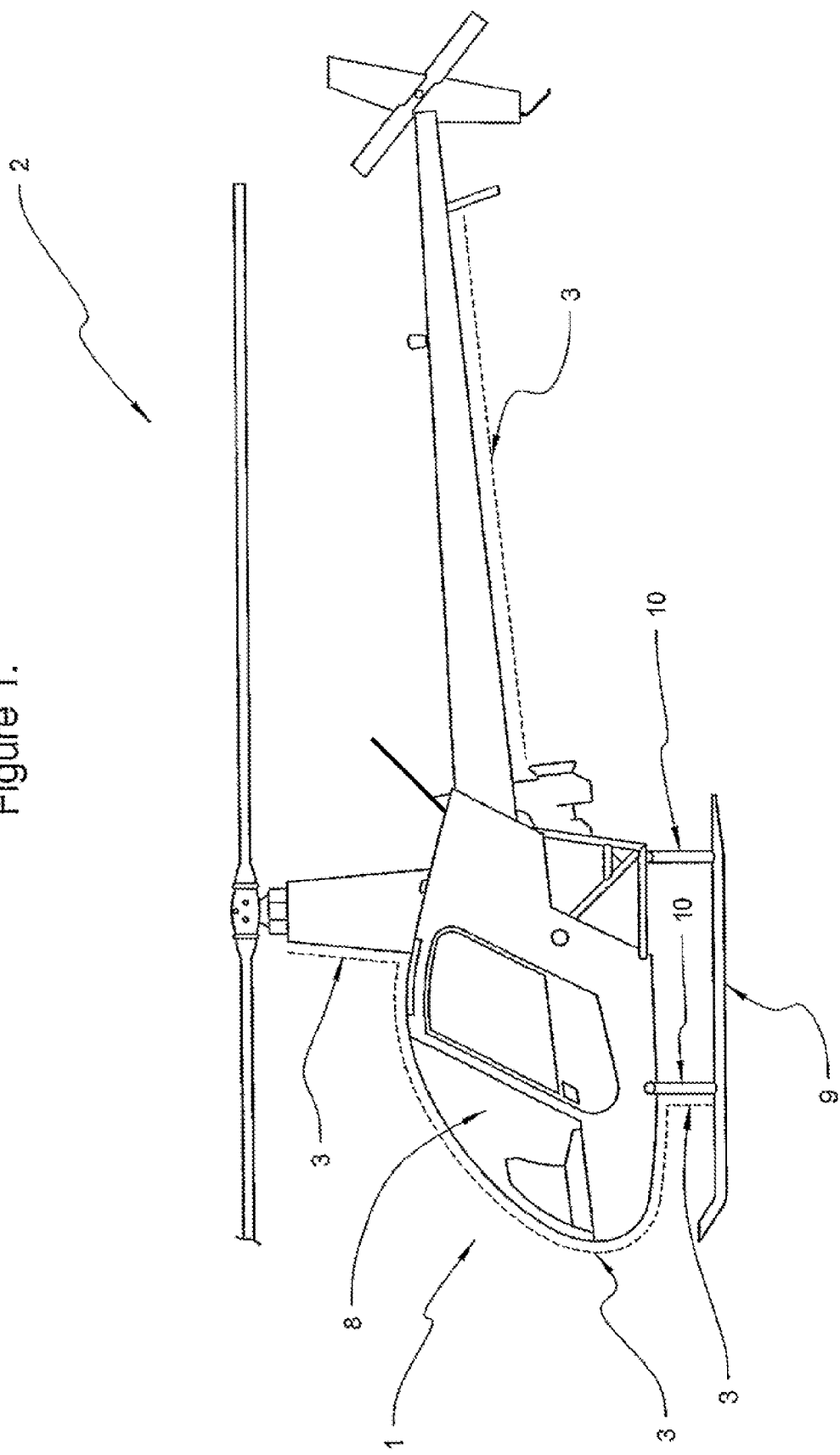
FIG. 1. shows a side elevation of a helicopter equipped with a preferred embodiment of the present invention.
Figure 2:
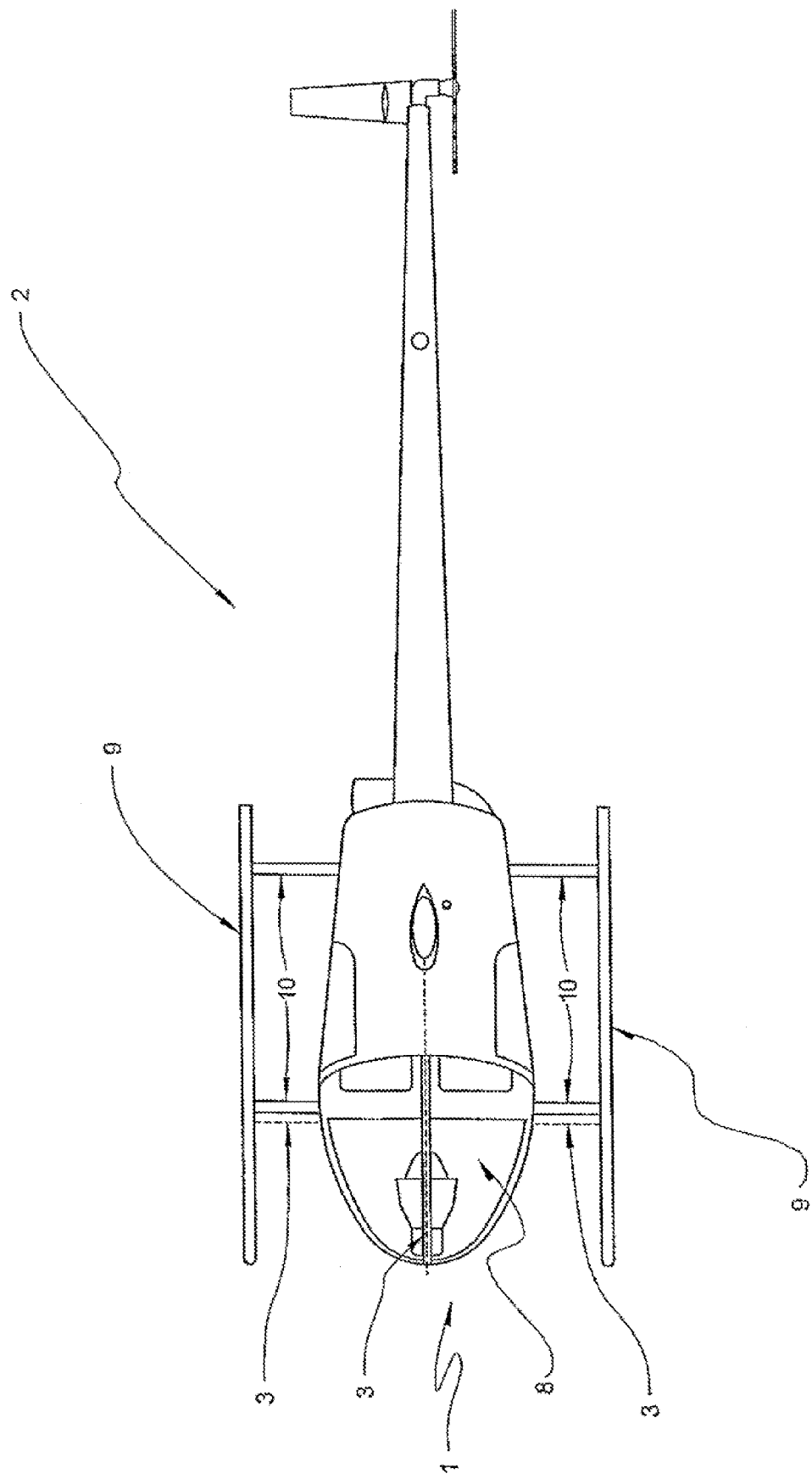
FIG. 2. shows a plan view of the helicopter shown in FIG. 1.
Figure 3:
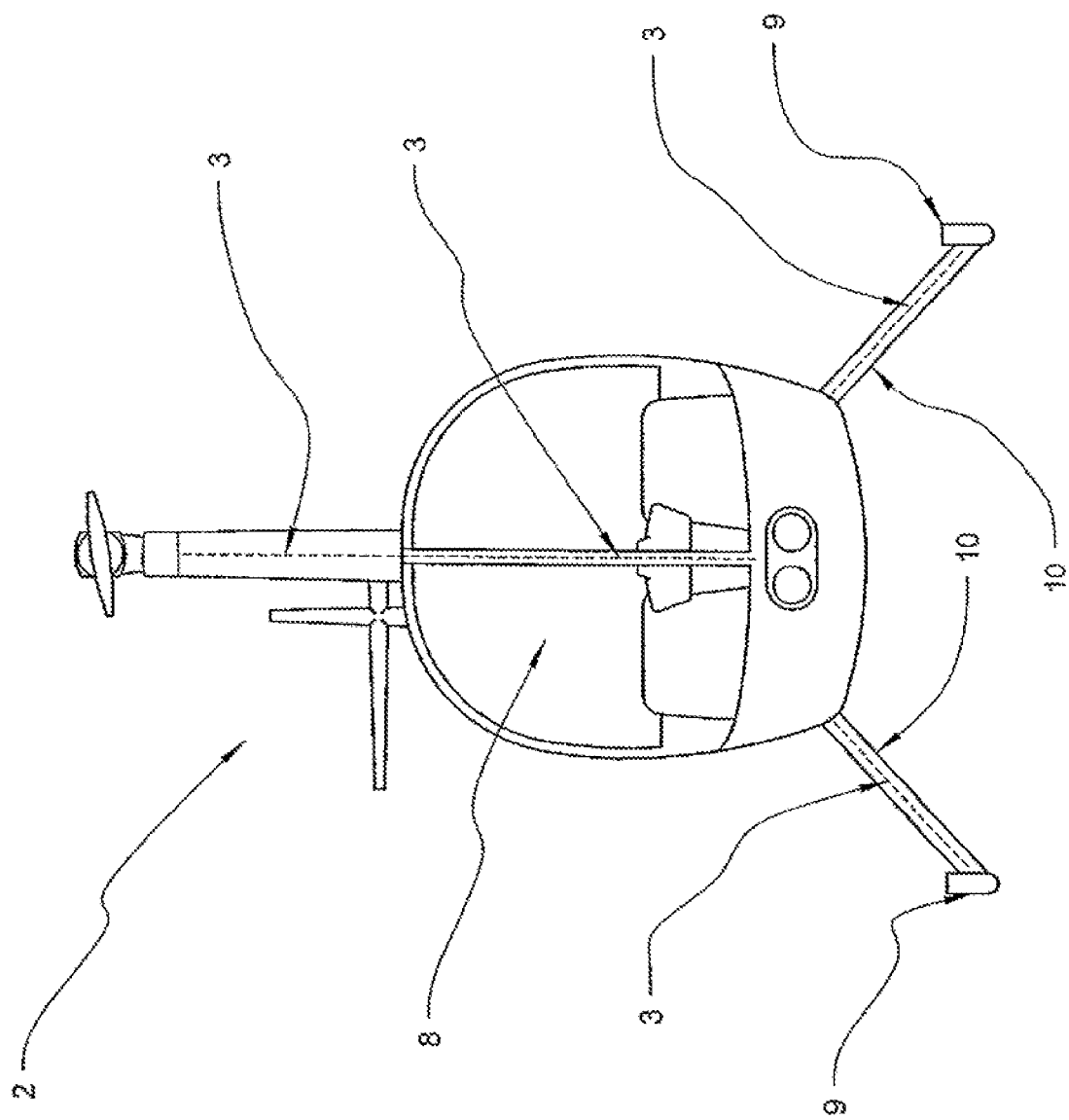
FIG. 3. shows a front elevation of the helicopter shown in FIG. 1.

FIGS. 1-3 show a first embodiment of the present invention in the form of a wire-strike system (1) fitted to an aircraft in the form of a helicopter (2), the system (1) being broadly comprised of a wire cutter formed from a plurality of elongated ships (3) positioned along strategic surfaces of the helicopter (2).

Each strip (3) is comprised of an electrically insulated mounting base portion (4) formed from a plastic, rubber, or other electrical insulator and a pair of electrodes in elongated form (5, 6) insulated from each other. The electrodes (5, 6) are attached to the base portion (4) along two parallel tracks running along the longitudinal axis of the base portion (4), and positioned such that the upper surface of each electrode (5, 6) is exposed. A constant physical separation is maintained between the two conductors (5, 6) of a sufficient distance to avoid arcing, sparking or other electrical short-circuiting between the electrodes (5, 6). A power source (not shown) is connected to both electrodes (5, 6) and is capable of generating an electrical potential difference therebetween. The strips (3) may be attached to an aircraft by any convenient method, such as screw fixing, riveting, adhesive, or formed as an integral component in the craft's surface structure.

Figure 4:
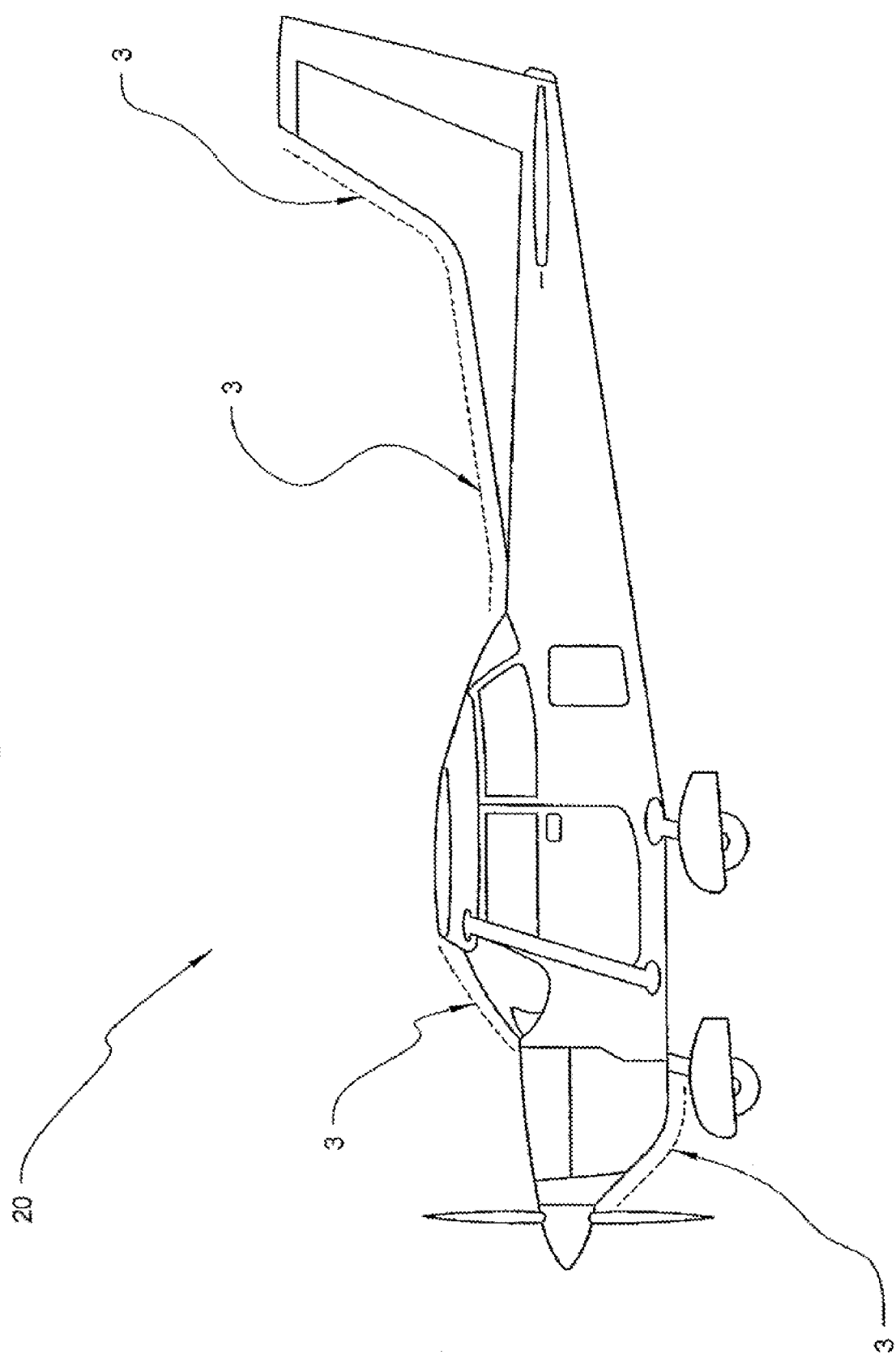
FIG. 4. shows a side elevation of an aircraft equipped with a preferred embodiment of the present invention.
Figure 5:
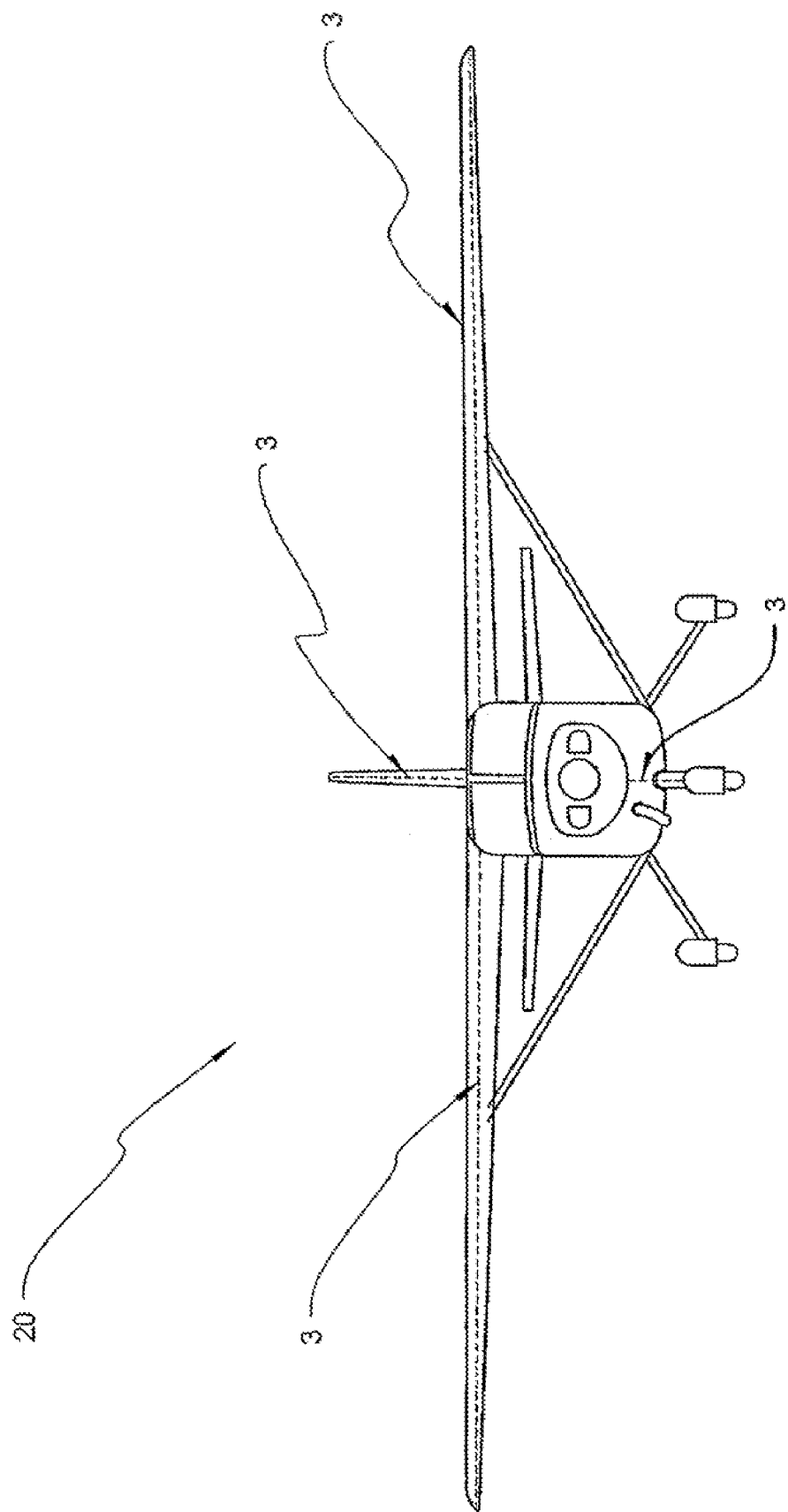
FIG. 5. shows a front elevation of the helicopter shown in FIG. 4.
Figure 6:
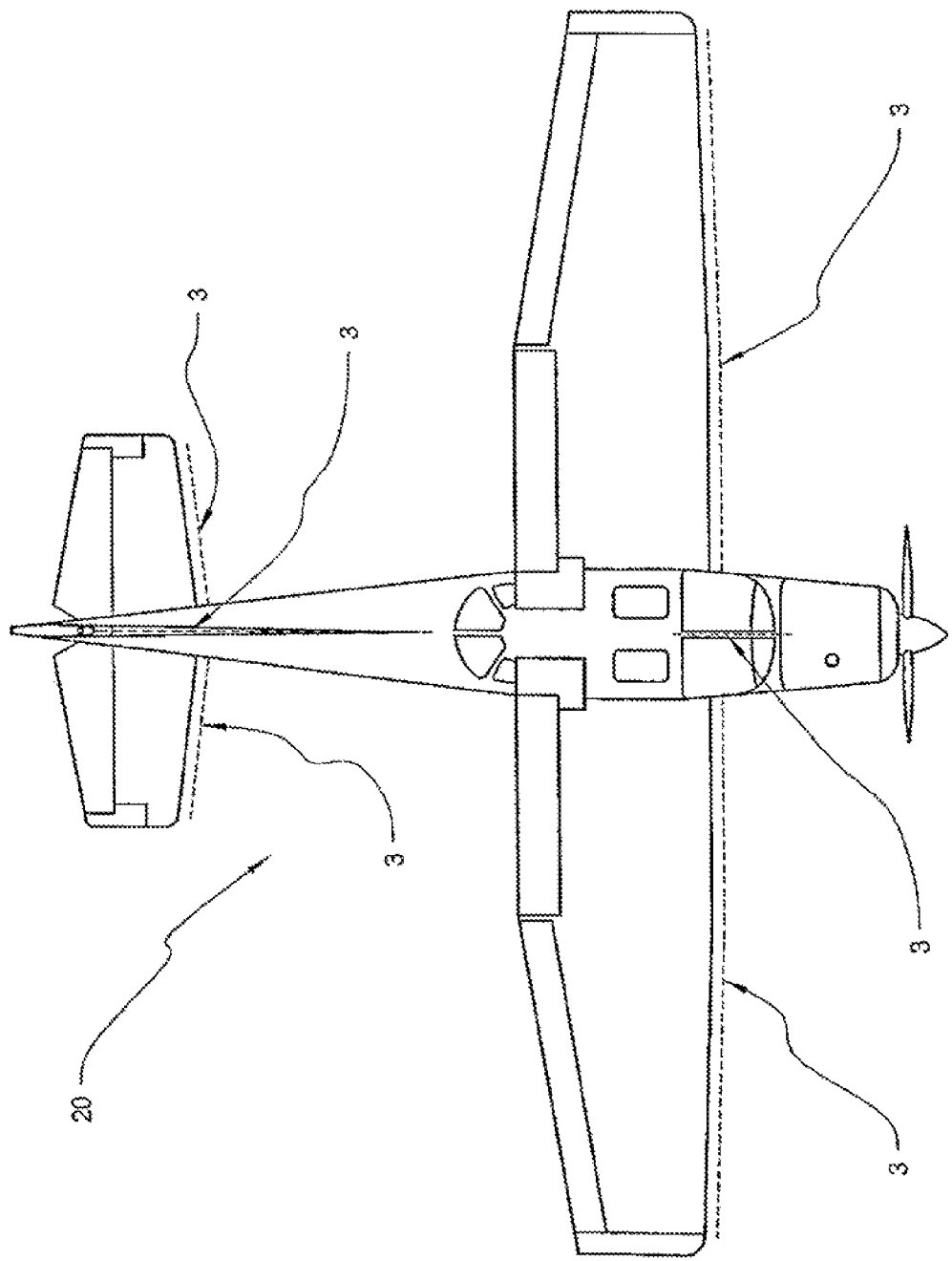
FIG. 6. shows a plan view of the helicopter shown in FIG. 4.

FIGS. 4-6 show an embodiment with the wire strike system (1) fitted to a light aircraft (20). Again, the electrode strips (3) are located along the leading edge, flight controls and tail plane surfaces likely to encounter a wire strike.

The electrode strips (3) are shown in more detail in FIGS. 7-10 (as described more fully below). However, in FIGS. 1-6, 11, and 13-14, the strips (3) are represented by a broken line shown adjacent the aircraft's (2, 20, 200) surface, rather than in direct contact to emphasise the strips' (3) location. It will be understood that this is symbolic only, and that the strips (3) are actually attached directly to a portion of the aircraft (2, 20, 200).

It will be appreciated the system (1) described herein is exemplary only, and alternative configurations and implementations are possible without departing from the scope of the invention. The strips (3) may be positioned upon different surfaces, or attached by an alternative method. In alternative configurations (not shown) the system may be formed as patches to cover key areas such as nose cones, flight control surfaces or the like.

In yet further embodiments, the present invention may be incorporated into the rotors of a helicopter and/or the propellers of a fixed wing craft. Such configurations clearly require appropriate rotating electrical connections (slip rings or the like) to maintain a voltage difference between two electrodes mounted (for example) longitudinally along the leading edge of a rotor/propeller blade.

To ensure the optimum aerodynamic profile of such critical surfaces is maintained, a sacrificial rupturable covering (not shown) may be fitted over the electrodes (5, 6). The sacrificial covering would readily rupture/breach in a wire-strike, allowing the impacted wire to contact the electrodes (5, 6) below.

The wire cutter strips (3) may be formed in a variety of configurations as illustrated in FIGS. 7a)-c), respectively showing a section of three embodiments of wire cutter strip (3) with 2, 3 and 5 electrodes (5, 6), positioned on an insulated mounting portion (4). The electrodes (5, 6) are placed on the outer surface of a mounting portion (4) with an outwardly convex cross-section, the electrodes (5, 6) extending parallel to each other and to the longitudinal axis of the strip (3). Increasing the number of electrodes (5, 6) effectively increases the contact surface area available to sever a contacting wire, and thus accommodating different aircraft approach attitudes prior to impact.

Figure 8:
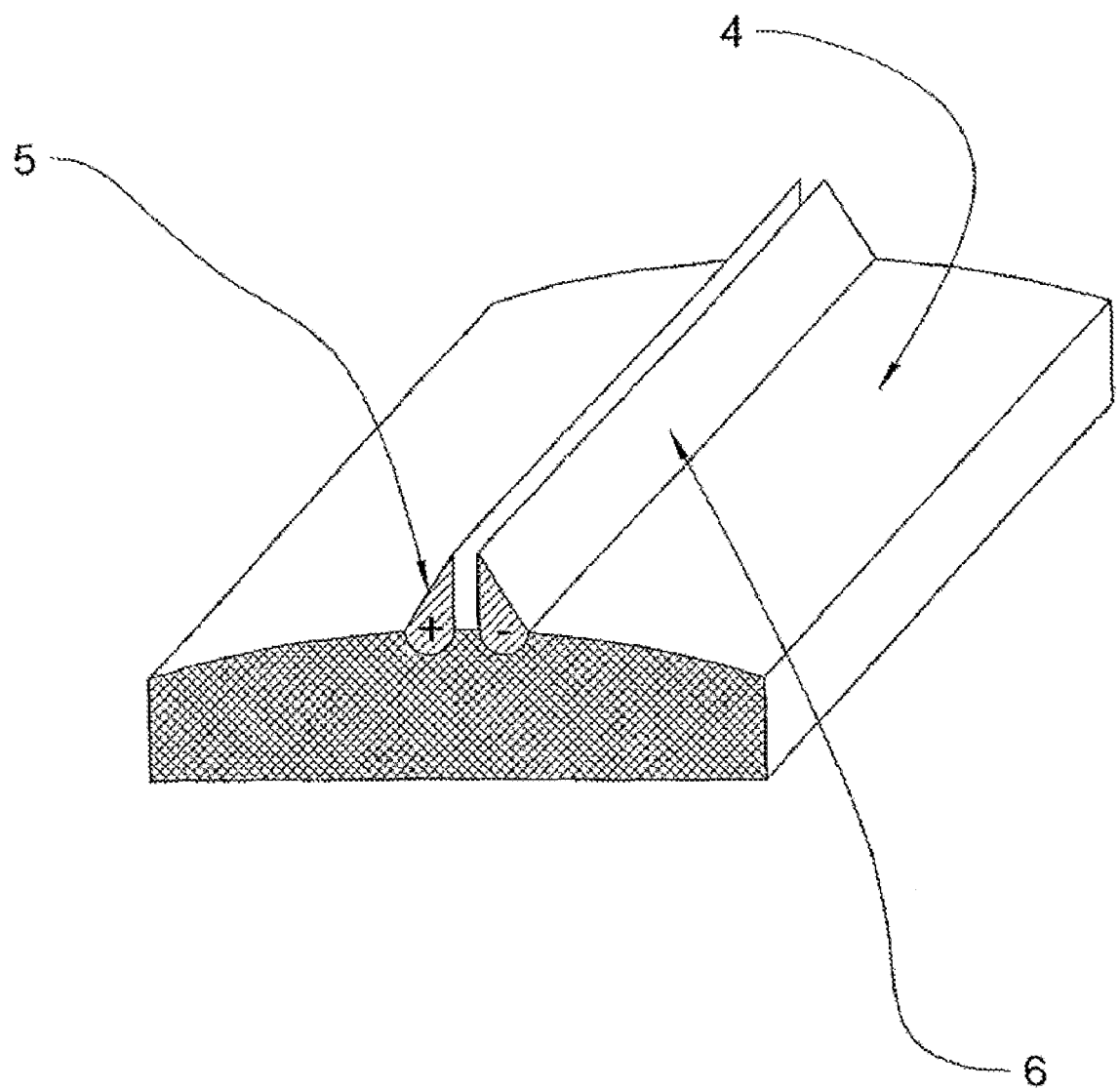
FIG. 8. shows a perspective view of the wire cutter electrodes in the form of an elongated strip with a cutting edge.

FIG. 8 shows a further embodiment of a wire cutter strip (3) with a pair of electrodes (5, 6) with sharpened outward edges. Such a configuration adds the effect of a mechanical cutting action to the thermoelectric cutting action of the present invention.

As shown in FIGS. 1 and 2, the wire cutter strips (3) are preferentially fitted to the portions of an aircraft likely to encounter the initial impact points in a wire-strike such as the front of the helicopter cockpit (8). The strips (3) may also be located at any positions (known as entrapment areas) into which an impacted wire may be deflected or guided before being caught, e.g. the skids (9) and associated support struts (10).

It will be noted from FIG. 1, that the strips (3) may be applied to both the front and rear support struts (10) of the skids (9) and to other rear surfaces of the helicopter (2) to protect against potential impact during rearward flight when a pilots visibility is highly restricted.

Figure 9:
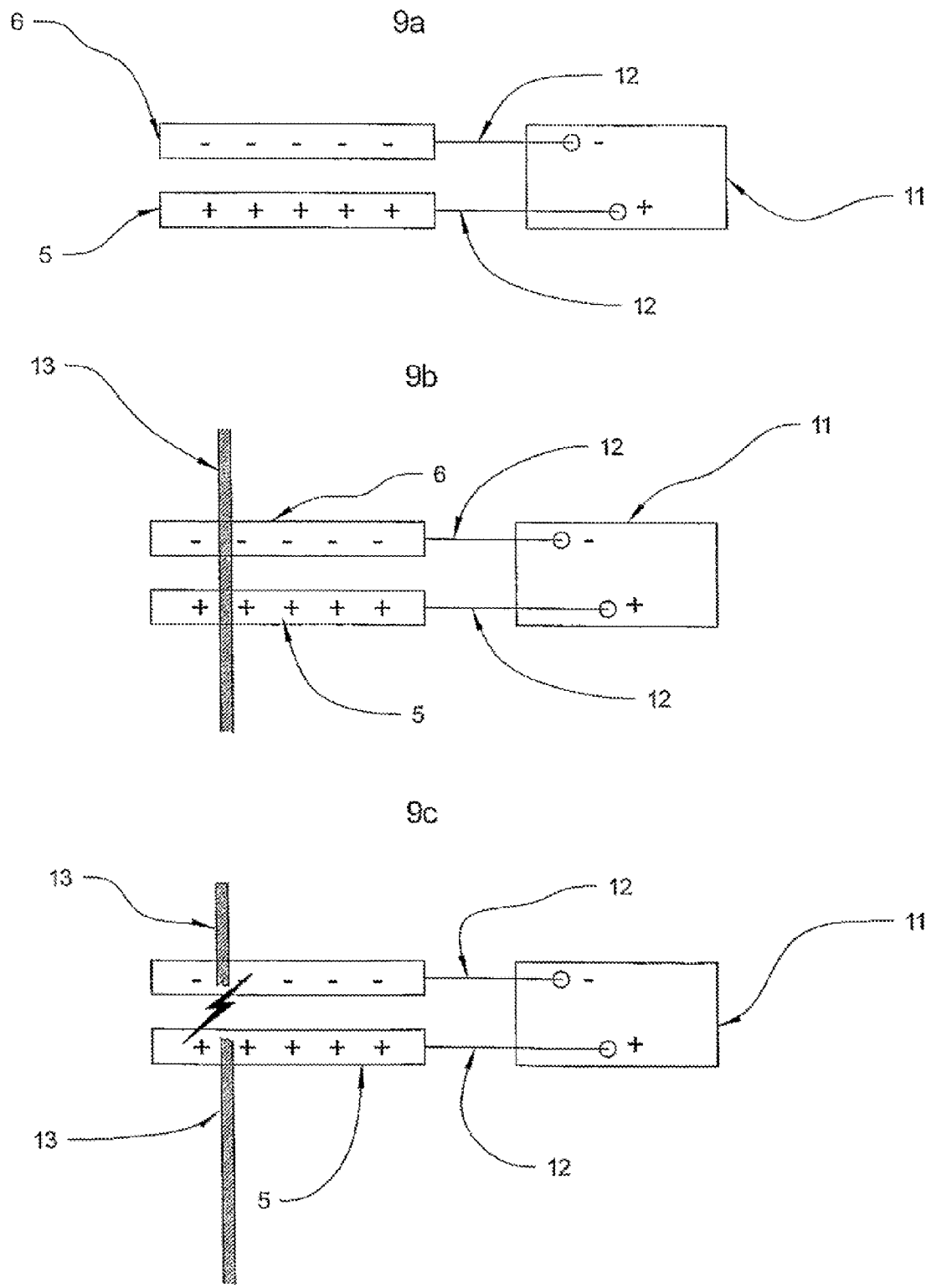
FIG. 9. shows a schematic representation of the severing action of a wire utilising an embodiment of the present invention.

In the event of a wire-strike with a conductive wire, all embodiments employ a common principle to defend the aircraft from a catastrophic outcome as illustrated schematically in FIG. 9. In a typical wire strike, an aircraft would impact a substantially horizontal suspended wire during forward flight. FIG. 9a) shows the situation before impact, whereby the wire cutter electrodes (5, 6) are electrically and physically separated from each other with a potential difference applied therebetween by a power source (11), connected to the electrodes (5, 6) via appropriate electrical connections (12). As shown in FIG. 9b), the impacting wire (13) coming into contact with a pair of electrodes (5, 6) forms an electrical short circuit between the elements (5, 6). The electrical power supply (11), which is connected to the elements (5, 6), thus discharges through the section of wire bridging the two elements (5, 6). The discharge causes a high current flow through the bridging section of wire due to the low resistance presented by such a short section of conductive wire. As shown in FIG. 9c), the high current flow heats the wire (13) to melting point whereupon it breaks and falls free from the aircraft (2). The kinetic energy due to the aircraft's movement also aides (but is not essential) in severing the wire as it is heated by the current flow.

Figure 10:
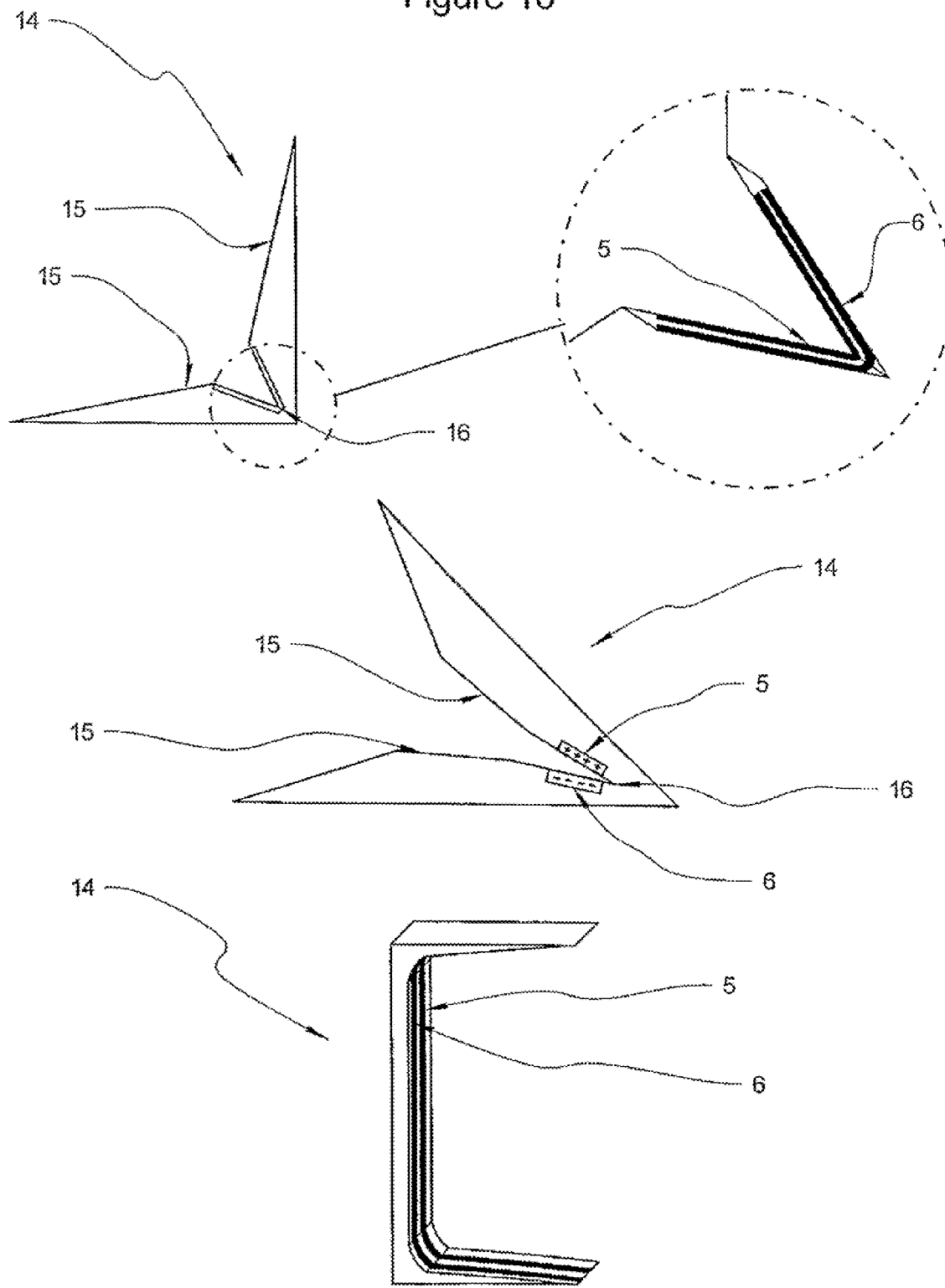
FIG. 10. shows further embodiments of wire cutter electrodes in the form of entrapment elements.

FIG. 10 shows a further embodiment of the present invention whereby a pair of wire cutter electrodes (5, 6) are configured as a corner entrapment elements (14). The entrapment element (14) may be utilised with or without additional elongated wire cutter strips (3) positioned along the leading edges and other strategic surfaces of the aircraft. Ideally, the entrapment elements (14) are positioned in natural entrapment zones where an impacted wire (not shown) would naturally be deflected by surfaces of the aircraft such as the fuselages wings, cockpit and so forth. Typical entrapment areas of many craft include the juncture between the rotor of a helicopter (2) and the upper cockpit/engine portion, the mounting points between the fixed undercarriage and/or skids and the fuselage, wing roots and the like. Entrapment elements (14) may be configured in a variety of configuration, but generally consist of two convergent deflector portions (15) located either side of an intersection (16).

FIG. 10a shows an entrapment element (14) with a notch configuration at the intersection (16) whereby a pair of parallel, but spaced apart electrodes (5, 6) extend around the outer perimeter of the notch either side of the junction (16). A wire contacting either side of the notch intersection (16) would thus create a short circuit between the electrode pair (5, 6). FIG. 10b shows an alternative configuration whereby opposing sides of the notched intersection (16) have an electrode of opposing polarity. In such a configuration, a wire guided into the notch intersection (16) would only create a short circuit when simultaneously contacting both opposing sides of the notch (16), thus contacting both electrodes of a pair (5, 6).

The embodiments shown in FIGS. 10a) and 10b) may be configured such that the electrodes (5, 6) or deflector portions (15) are formed with a sharpened outer edge to provide a mechanical cutting action in addition to the electro-thermal cutting action of the wire cutter electrodes (5, 6). FIG. 10c) shows a further embodiment of entrapment elements (14) suitable for re-entrant corners and the like, such as the span between a helicopter skid and the fuselage and is generally configured in an elongated "C" shape with a pair of electrodes (5, 6) located about one or more sides of the "C" shape.

Figure 11:
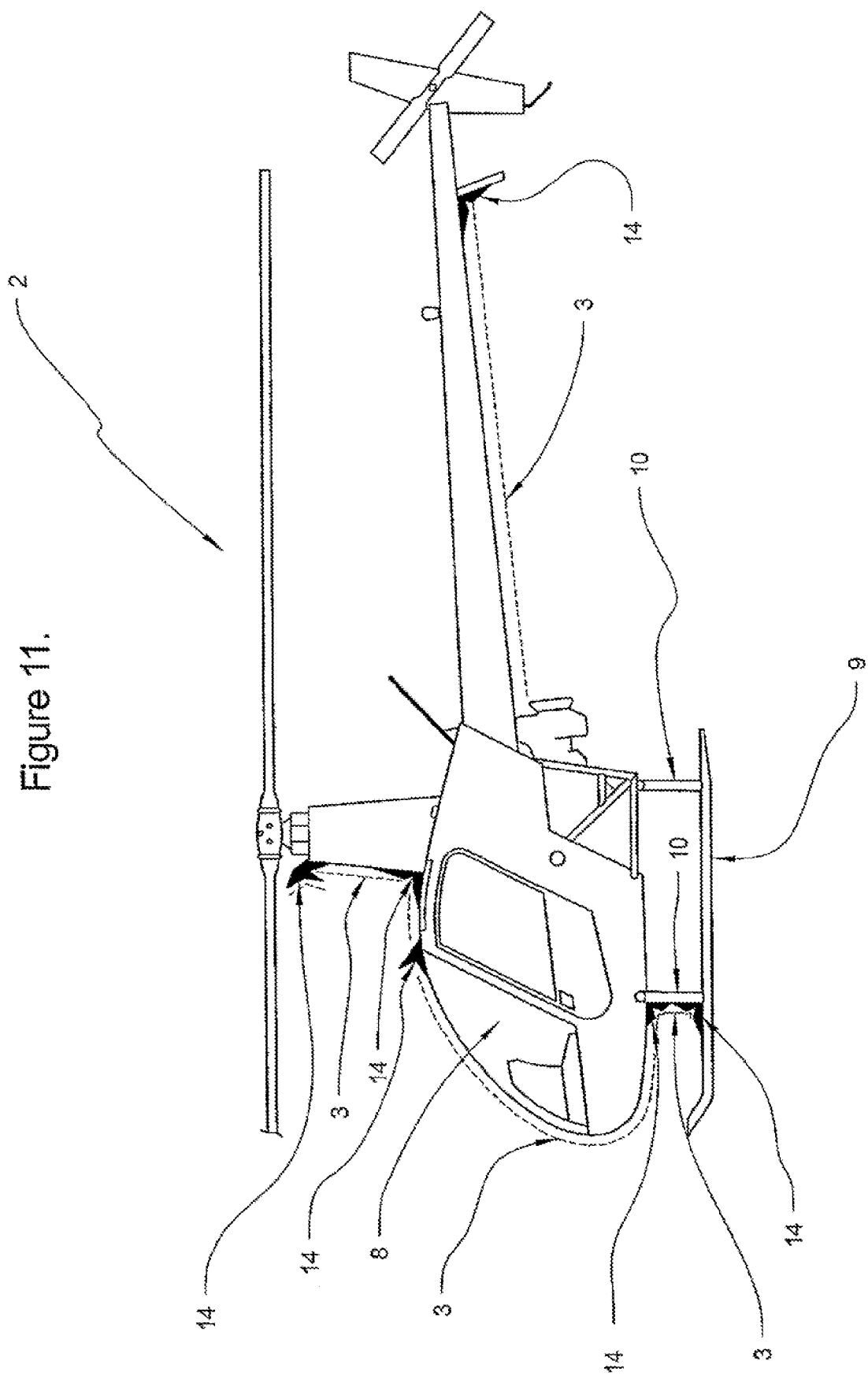
FIG. 11. shows a side elevation of the helicopter shown in FIG. 1, provided with a plurality of entrapment elements.

FIG. 11 shows an embodiment whereby the aircraft (2) shown in FIGS. 1-3 is further provided with plurality of entrapment elements (14) positioned at key positions about the aircrafts fuselage and flight surfaces where an impacted wire would be deflected. It will be appreciated that such entrapment elements (14) may be readily attached and detached from aircraft to permit existing aircraft to be retrofitted with the wire strike defence system (1) without significant structural alteration. Moreover, it also permits a smaller power supply to be employed to provide the requisite power for wire severing to the entrapment elements without the need to energise extended lengths of electrode conductors (5, 6) extending along long lengths of the craft's fuselage.

Figure 12:
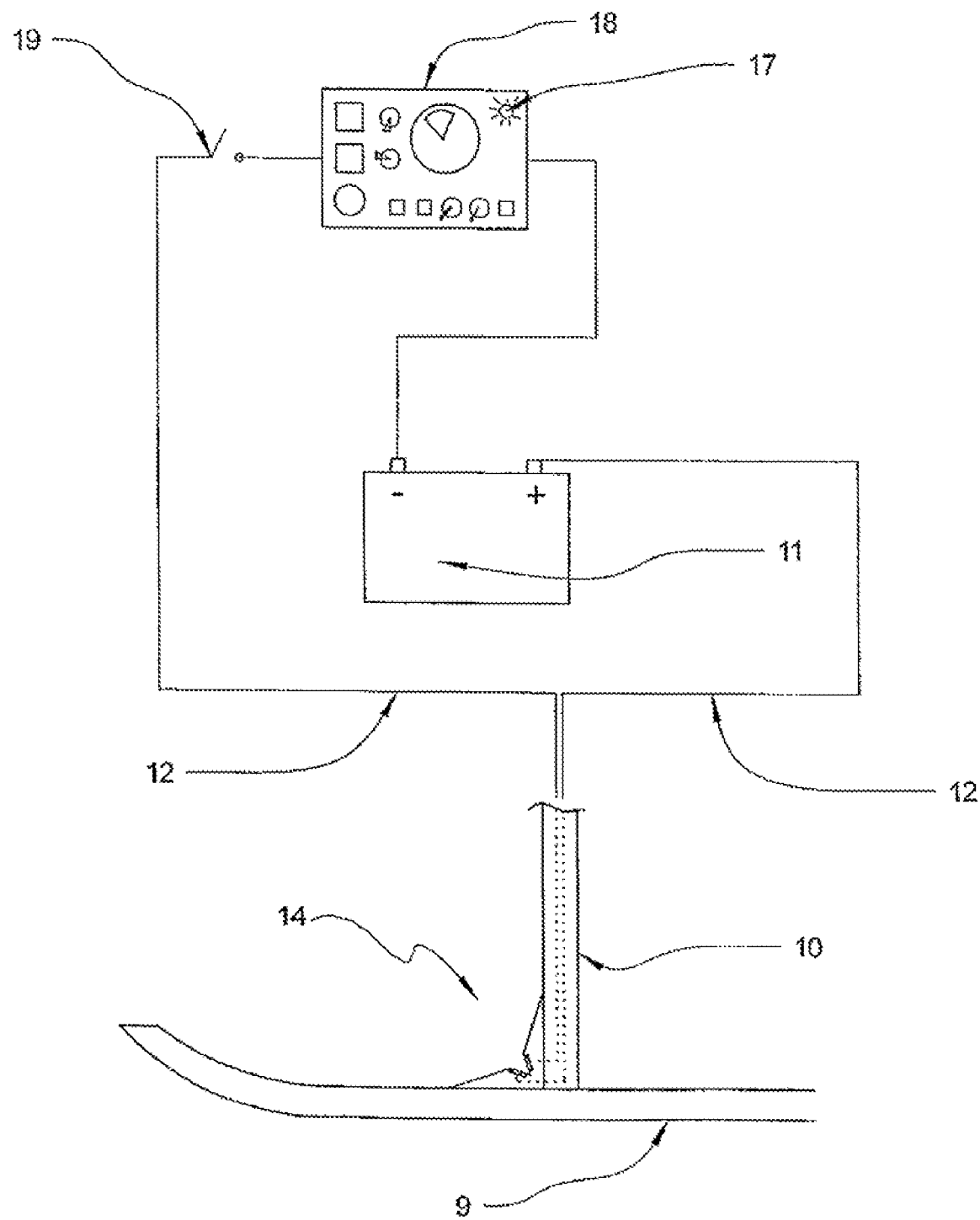
FIG. 12. shows a schematic system diagram of a further embodiment of the present invention.

FIG. 12, shows a schematic system diagram of the present invention (1) whereby an entrapment element (14) fitted at the juncture between a helicopter skid (9) and mounting strut (10) is connected via electrical connectors (12) to a power supply (11) in the form of a battery with further connections to a visual system status indicator (17) on the aircraft's instrumentation display (18) together with a system on/off switch (19). Further capabilities may be readily incorporated into the system such as an impedance measurement to determine whether any part of the circuit had been interrupted, indicating a fault. Conventional continuity circuit testing systems are unsuitable given that the circuit between the electrodes (5, 6) should always be open unless the aircraft impacts a wire.

Figure 13:
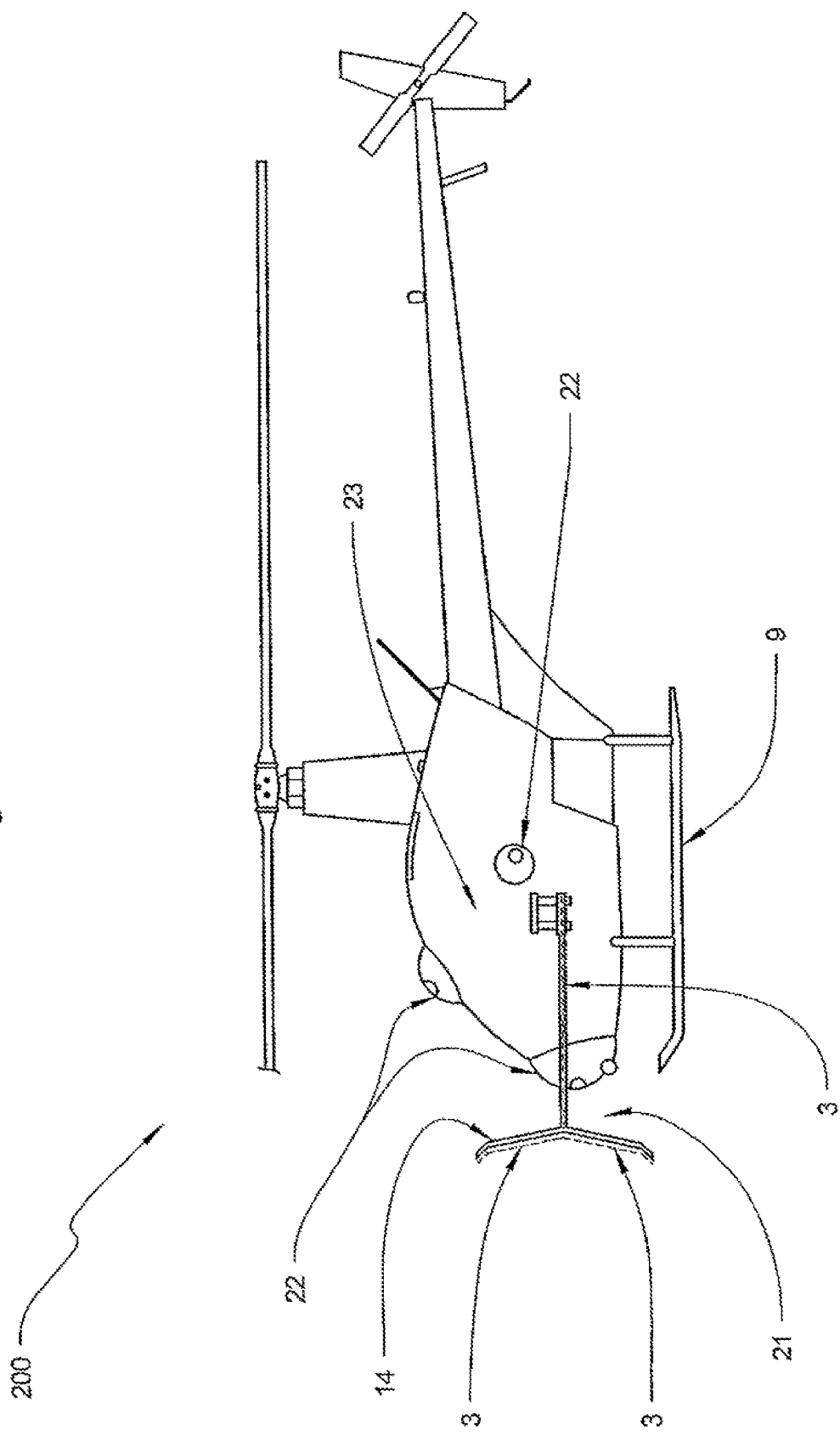
FIG. 13. shows a side elevation of a drone aircraft fitted with an offensive wire-strike system, and FIG. 14. shows a side elevation of the helicopter shown in FIG. 1 provided with an offensive wire-strike system in accordance with a further preferred embodiment.
Figure 14:
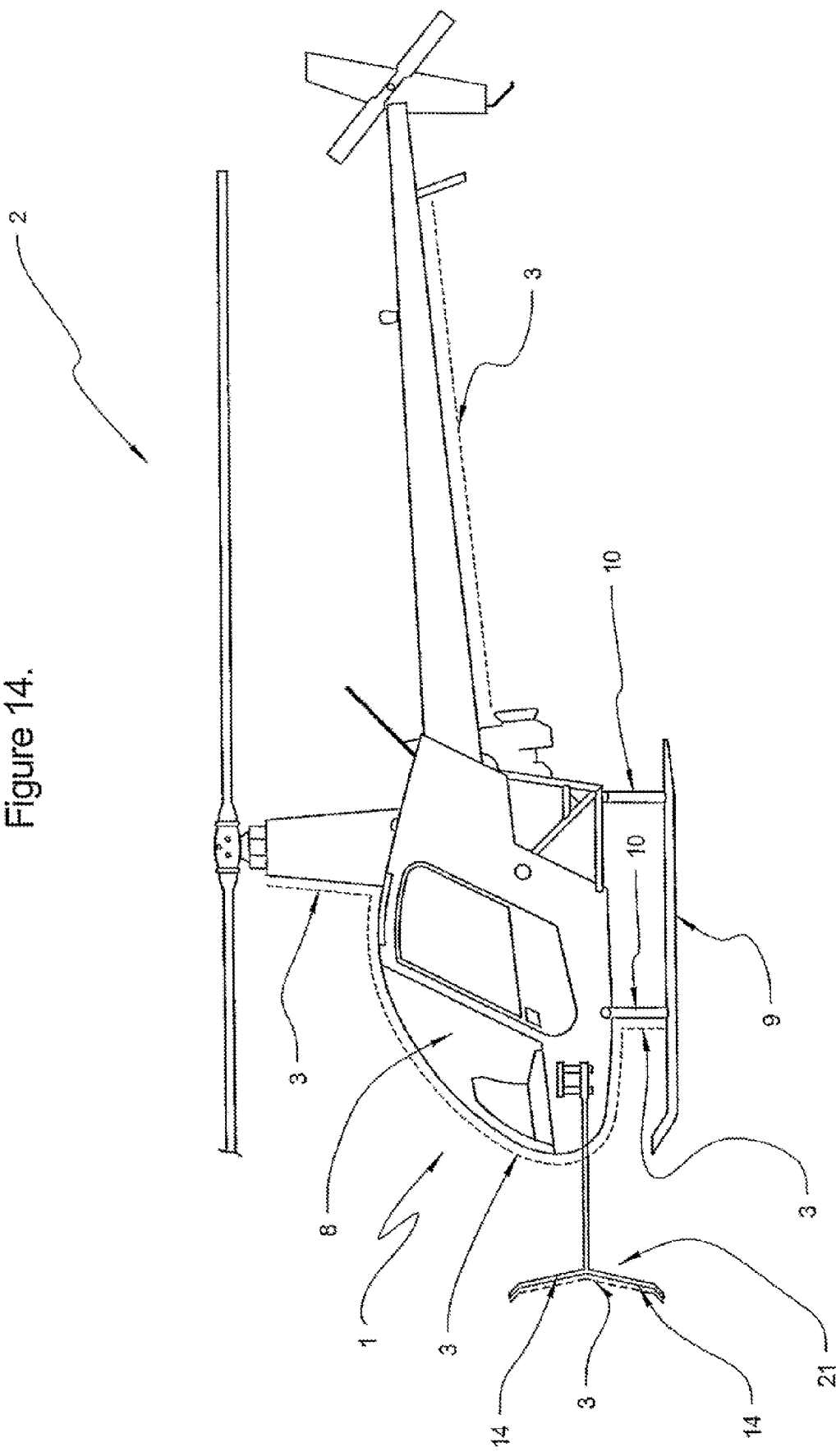

FIGS. 13 and 14 show further variants of the present invention in the form of a remotely piloted drone (200) fitted with an offensive wire cutter attachment (21). The drone (200) is indicative of the type used for military and/or security applications such as reconnaissance, surveillance, and offensive strike operations. The drone (220) is unmanned and guided remotely via wireless communications coupled with one or more external sensors (22) gathering optical or other electromagnetic data together with GPS (not shown) positioning systems and the like. It will be appreciated however that any convenient form of drone or other unmanned aircraft may be utilized if desired.

The drone (200) is capable of use for MOE applications whereby the craft is deliberately piloted to contact obstructions such as wires, communication lines and the like. To facilitate deliberate contact with such wires, the wire cutter attachment (21) projects forward of the drone's fuselage (23) to facilitate guiding the drone (22) into a pair of enlarged jaws forming the entrapment element (14) at the front of the cutter attachment (21).

FIG. 14 shows a comparable embodiment in which a helicopter (2) of the type displayed in FIGS. 1-3 has been retrofitted with the offensive wire cutter attachment (21) projecting forward from the helicopter cockpit/fuselage. It with be further appreciated that any suitable form of movable craft, both terrestrial and airborne may be fitted with a form of offensive wire cutter in accordance with the present invention to provide a capacity for deliberately severing wires, lines, cables and the like.

A proximity sensing means and appropriate control means (not shown) may also be incorporated to detect the presence of a wire prior to impact and selectively energise the wire cutter strip (3), and/or entrapment element (14), closest to wire before impact occurs.

The power supply may be provided by any convenient means, according to the characteristics of the aircraft. Larger aircraft may utilise the aircraft's electrical power supply, or a dedicated generator/transformer. Simpler arrangements may be provided by batteries or capacitor storage; for example, small helicopters such as that shown in FIGS. 1 and 2 may use a 36-48 volt battery with a 1200 amp discharge rate. Appropriate monitoring and system integrity checks may be incorporated into the aircraft's instrumentation to advise the pilot of the system's status.

The defence system (1) may be simply switched off when the aircraft is on the ground to avoid the risk of electrocution injury to humans or animals. Further safety precautions against inadvertent arcing, either a) on the ground (by ground crew's tools, watches, moisture and the like), or b) airborne (by small birds, insects or airborne moisture), can be achieved by application of a thin non-conductive coating over the electrodes (5, 6). The coating would be easily penetrated or scraped aside during a violent impact with a cable or wire, enabling an electrical contact to be made between the cable and the conducting elements (5, 6). The conducting elements (5, 6) may be formed from a variety of conductive substances including copper, steel, and carbon.

It can be thus seen that the present invention dispenses with the need for sharp, cumbersome and aerodynamically inefficient mechanical wire-strike cutters that may only be fitted to a restricted number of locations about the aircraft. The present invention provides a means of protecting virtually any surface of the aircraft without adversely impacting the flight performance or characteristics.

Tests have validated the effectiveness of the present invention (1) in ground and airborne impacts from stationary to over 70 km/h, impacting both single filament and multi-stand wires.

Aspects of the present invention have been described by way of example only and it should be appreciated that modifications and additions may be made thereto without departing from the scope thereof.

The invention claimed is:

1. A wire-strike system including:
a non-explosive wire cutter including at least one pair of electrodes, electrically insulated from each other and mounted to an outer surface of an aircraft, said electrodes being connectable to a power source capable of generating an electrical potential difference between the electrodes and in the event of a wire-strike, supplying a short-circuit current flow through a portion of said wire connecting both electrodes.

2. A system as claimed in claim 1, wherein said electrodes are attached to an electrically insulated mounting base portion.

3. A system as claimed in claim 2, wherein said base portion and electrodes are formed as an elongated strip, wherein the electrodes are elongated and located adjacent, but spaced apart from each other.

4. A system as claimed in claim 1, wherein a pair of electrodes are orientated substantially parallel to each other.

5. A system as claimed in claim 1, wherein at least one pair of said wire cutter electrodes are formed as an entrapment element, capable of guiding a wire, for severing, into an intersection between convergent deflector portions located either side thereof.

6. A system as claimed in claim 5, wherein said intersection is notched.

7. A system as claimed in claim 5, wherein electrodes located on said deflector portions and/or said intersection are formed with an outward cutting edge.

8. A system as claimed in claim 5, wherein electrodes of opposing polarity are positioned on opposing sides of said intersection.

9. A system as claimed in claim 1, wherein said wire cutter includes a plurality of electrode pairs, independently energisable by said power source.

10. A system as claimed in claim 9, wherein said plurality of electrode pairs are capable of being simultaneously energised.

11. A system as claimed in claim 9 wherein said plurality of electrode pairs are capable of being selectively energised.

12. A system as claimed in claim 11, further including sensing and control means for sensing the proximity of a wire and selectively energising an electrode pair closest the wire.

13. A system as claimed in claim 11, wherein said proximity sensing means including capacitive or inductive sensors.

14. A system as claimed in claim 1, wherein the wire cutter electrodes may be formed as a series of substantially equidistant, parallel conductors of alternately opposing electrical polarity.

15. A system as claimed in claim 1, wherein said electrodes are provided with a rupturable, non-conductive coating or film.

16. A system as claimed in claim 1, further including an electrical power source and electrical connections between said power source and the at least one pair of wire cutter electrodes.

17. An aircraft provided with a wire-strike system as claimed in claim 1.

18. An aircraft as claimed in claim 17, wherein said electrodes are fixed directly to electrically non-conductive portions of the aircraft's surface.

19. An aircraft as claimed in claim 17, wherein said wire cutter electrodes are positioned on one or more leading surfaces of an aircraft.

20. An aircraft as claimed in claim 17, wherein said at least one pair of said wire cutter electrodes are formed as an entrapment element, capable of guiding a wire for severing into an intersection between convergent deflector portions located either side thereof, said entrapment elements being positioned at one or more entrapment positions about the aircraft3 s surface.

21. An aircraft as claimed in claim 17, wherein said wire cutter includes a plurality of electrode pairs, independently energisable by said power source.

22. An aircraft as claimed in claim 21, further including sensing and control means for sensing the proximity of a wire and selectively energising an electrode pair closest the wire.

23. An aircraft provided with a wire-strike system including:

a non-explosive wire cutter including at least one pair of electrodes, electrically insulated from each other and mounted upon an outer surface of the aircraft, said electrodes being connected to a power source capable of generating an electrical potential difference between the electrodes and in the event of a wire-strike, supplying a short-circuit current flow through a portion of said wire connecting both electrodes;

an electrical power source, and electrical connections between said power source and the at least one pair of wire cutter electrodes.

24. An aircraft as claimed in claim 23, wherein said electrodes are attached to an electrically insulated mounting base portion.

25. An aircraft as claimed in claim 24, wherein said base portion and electrodes are formed as an elongated strip, wherein the electrodes are elongated and located adjacent, but spaced apart from each other.

26. A method of severing a wire impacting an aircraft in a wire-strike, using a system including:

a non-explosive wire cutter including at least one pair of electrodes, electrically insulated from each other and mountable upon an outer surface of an aircraft, said electrodes being connected to an electrical power source, said method including:

generating an electrical potential difference between the elements;

and in the event of a wire-strike, supplying a short-circuit current flow through a portion of said wire connecting both elements; and heating said portion of said wire with the short circuit current flow connecting both elements until said wire at least partially melts and severs.

\* \* \* \* \*